United States Patent [19]

Hsu

[11] Patent Number: 5,389,043

[45] Date of Patent: Feb. 14, 1995

[54] BICYCLE TOP-PULL FRONT DERAILLEUR

[76] Inventor: Yi-Hsung Hsu, No. 9, Lane 130, Sec. 1, Kwangfu Road, San Chung City, Taipei Hsien, Taiwan, Prov. of China

[21] Appl. No.: 239,758

[22] Filed: May 9, 1994

[51] Int. Cl.$^6$ ............................................. F16H 9/00
[52] U.S. Cl. ...................................................... 474/80
[58] Field of Search .................................. 474/78–82, 474/140

[56] References Cited

U.S. PATENT DOCUMENTS

| | | | |
|---|---|---|---|
| 4,674,995 | 6/1987 | Iwasaki | 474/80 |
| 4,778,436 | 10/1988 | Nagano | 474/80 |
| 5,312,301 | 5/1994 | Kobayashi | 474/80 |

*Primary Examiner*—Michael Powell Buiz
*Attorney, Agent, or Firm*—Poms, Smith, Lande & Rose

[57] ABSTRACT

A bicycle front derailleur includes a support ring secured to the seat tube of the bicycle frame. The support ring has a side extension on which two links are pivoted. The two links are further pivoted to a chain mover member through which the drive chain extends to be moved thereby. The two links, the side extension and the chain mover member form a parallelogram linkage. One of the links has a sideways lever attached thereto with a control cable secured to the lever so that by pulling the control cable with a manual shifter, the lever rotates the link about the pivot thereof with the side extension so as to move the chain mover member with the coupling of the other pivot thereof to the chain mover member. A biasing spring is disposed between the support ring and the link having the lever thereon to bias the link to an originally-set position. Stroke adjusting screws are provided on the side extension, which screws have an adjustable length relative to the links for adjusting the rotation range of the links and thus the stroke of the chain mover member.

5 Claims, 3 Drawing Sheets

BICYCLE TOP-PULL FRONT DERAILLEUR

FIELD OF THE INVENTION

The present invention relates generally to a bicycle and in particular to a top-pull type front derailleur structure of the bicycle.

BACKGROUND OF THE INVENTION

A derailleur bicycle usually comprises a rear derailleur mounted in association with the rear wheel of the bicycle. Besides the rear derailleur system, there is a front derailleur mounted to the seat tube of the bicycle frame and associated with the chain wheels that is fixed to and thus rotatable with the pedals of the bicycle. Usually, each of the derailleurs is controlled by a manual shifter which is mounted on the handlebar or the down tube of the bicycle at a location ready to be operated by a bicyclist sitting on the bicycle saddle. The movements of the manual shifters are independently transmitted to the derailleurs by means of cables connected therebetween to switch the drive chain of the bicycle between chain wheels of different diameters at the front and rear chain wheel sets.

Conventionally, the front derailleur system is down-pull type which means that the cable that controls the front derailleur has to extend to surround around the bottom of the bicycle frame and then upward to the shifter. An example of the conventional down-pull type front derailleur is shown in FIG. 3 of the attached drawings.

In FIG. 3, a portion of a bicycle frame 90 to which the conventional front derailleur 94 is mounted is shown. The bicycle frame 90, as is well known, comprises a seat tube 93 and a down tube 95, both being jointed to a five-pass joint member on which the pedal is rotatably mounted. The five-pass joint is invisible in FIG. 3. The front derailleur 94 is secured to the seat tube 93. The front derailleur 94 comprises a moving block 940 pivoted thereto and a chain mover member 941 which is pivoted to the moving block 940. The chain mover member 941 has an opening or slot through which the drive chain 92 which is drivingly engageable with one of the chain wheel sections of the front chain wheel set 91 extends.

The front derailleur 94 comprises a cable 942 which has one end secured to the moving block 940 and an opposite end extending downward to partially surround around the bottom of the frame 90 and then upward along the down tube 95 to be secured to the manual shifter (not shown in FIG. 3) so that by operating the shifter by the bicyclist who is sitting on the saddle (not shown), the cable 942 pulls the moving block 940 downward to move the chain mover member 92 to switch the drive chain 92 between the chain wheel sections of the chain wheel set 91.

Since the front derailleur 94 and the connection thereof with the cable 942 are completely un-shielded, once the bicycle moves through muddy surface or is used in a bad weather, wet dirt in the form of mud or paste may attach to the moving parts of the front derailleur 94. When the dirt dries, it may become solid and hard and thus interfere the pulling of the cable 942 and the operation of the front derailleur 94.

It is therefore desirable to provide a bicycle front derailleur structure which overcomes the above-mentioned problems of the conventional, down-pull type bicycle front derailleur.

SUMMARY OF THE INVENTION

The principal object of the present invention is to provide a top-pull type bicycle front derailleur which comprises a moving block controlled by pulling a cable connected thereto upward to switch the drive chain between different chain wheel sections of the front chain wheel set.

In accordance with an aspect of the present invention, there is provided a top-pull type bicycle front derailleur comprising a support ring secured to the seat tube of the bicycle frame. The support ring has a side extension on which two links are pivoted. The two links are further pivoted to a chain mover member through which the drive chain extends to be moved thereby. The two links, the side extension and the chain mover member form a parallelogram linkage. One of the links has a sideways lever attached thereto with a control cable secured to the lever so that by pulling the control cable with a manual shifter, the lever rotates the link about the pivot thereof with the side extension so as to move the chain mover member with the coupling of the other pivot thereof to the chain mover member. A biasing spring is disposed between the support ring and the link having the lever thereon to bias the link to an originally-set position. Stroke adjusting screws are provided on the side extension, which screws have an adjustable length relative to the links for adjusting the rotation range of the links and thus the stroke of the chain mover member.

BRIEF DESCRIPTION OF THE DRAWINGS

The present invention will be better understood from the following description of a preferred embodiment of the present invention, with reference to the attached drawings, wherein.

DETAILED DESCRIPTION OF THE PREFERRED EMBODIMENT

Figure 1:
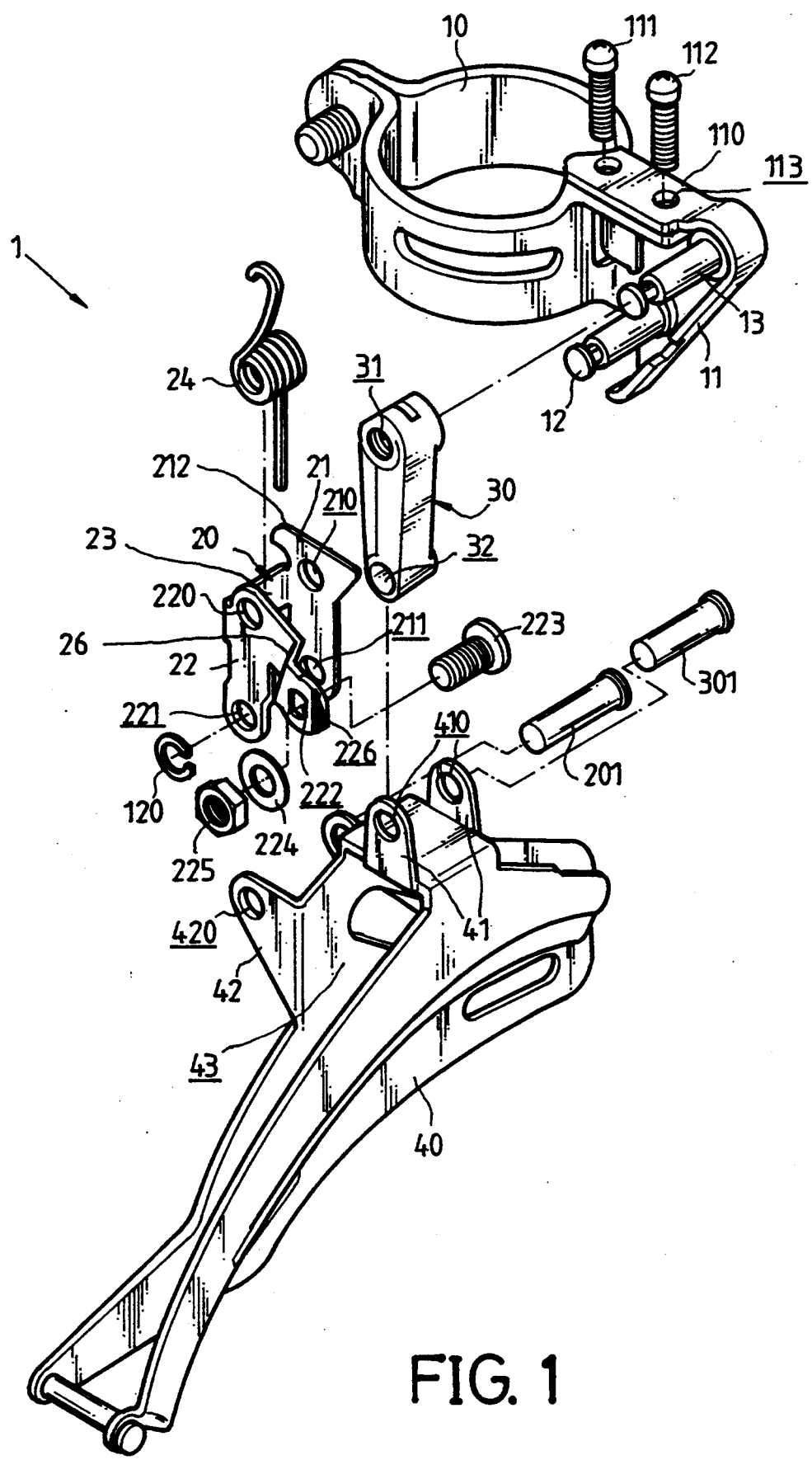
FIG. 1 is an exploded perspective view showing a top-pull bicycle front derailleur constructed in accordance with the present invention.
Figure 2:
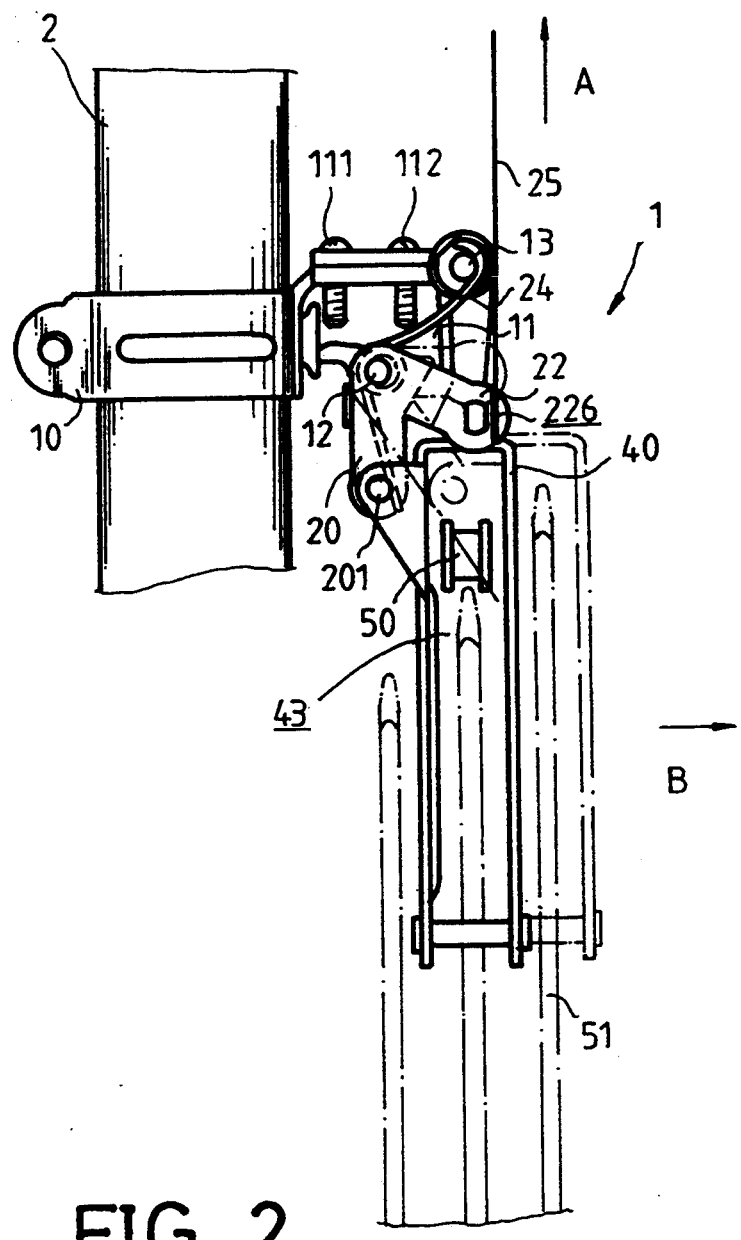
FIG. 2 is a side elevational view showing the securing of the front derailleur of the present invention to the seat tube of a bicycle and the switching of the chain between different chain wheel sections of the front chain wheel set by the front derailleur of the present.
Figure 3:
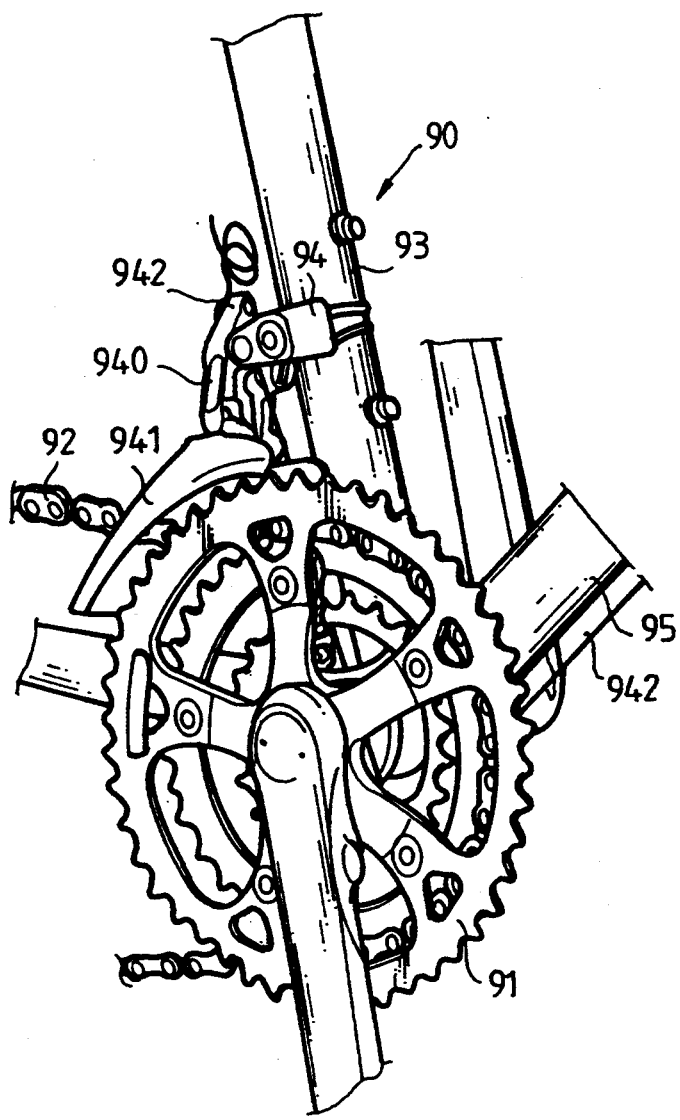
FIG. 3 is a perspective view showing a prior art front derailleur and a portion of a bicycle frame to which the prior art derailleur is mounted.

With reference to the drawings and in particular FIGS. 1 and 2, wherein a top-pull type bicycle front derailleur constructed in accordance with the present invention, generally designated with the reference numeral 1, is shown, the front derailleur 1 comprises a support ring 10 which is secured to a seat tube 2 (FIG. 2) of a bicycle frame so as to securely support the front derailleur 1 on the seat tube 2.

The support ring 10 comprises a side extension 11 having mounted thereto two pivots 12 and 13 which are substantially parallel. Respectively rotatably fit over the pivots 12 and 13 are a rocking link 20 and a pivoting link 30. A chain mover member 40 is then pivotally connected to the rocking link 20 and the pivoting link 30 by means of pivot pins 201 and 301 in such a way to form, together with the rocking link 20, the pivoting link 30 and the side extension 11, a parallelogram linkage so that by the rotation of the rocking link 20 relative to the side extension 11 of the support ring 10, the chain mover member 40, which has a slot 43 through which a drive chain 50 (FIG. 2) extends, is moved and thus causing the drive chain 50 to switch between different chain wheels 51 of the front chain wheel set (see FIG. 2) to perform speed changing operation.

The pivoting link 30 is an elongated member having pivot holes 31 and 32 formed on opposite ends thereof. The pivot hole 31 is rotatably fit over the pivot 13 of the side extension 11. The pivot hole 32 rotatably receives therein the pivot pin 301 which also extends through a pair of aligned holes 410 respectively formed on a pair of opposing tabs 41 attached to the chain mover member 40 so as to pivotally secure the chain mover member 40 to the pivoting link 30.

The rocking link 20 comprises two plates 21 and 22 parallel spaced from each other and connected together by a connection piece 23. The first plate 21 has formed thereon two holes 210 and 211 which is substantially distant from each other. The second plate 22 has also two holes 220 and 221 formed thereon and respectively aligned with the holes 210 and 211 of the first plate 21. The holes 210 and 220 which are aligned with each other receive the pivot 12 of the side extension 11 extending therethrough. The holes 211 and 221 of the rocking link 20 are rotatably secured to a pair of aligned holes 420 formed on two opposing tabs 42 of the chain mover member 40 by means of the pivot pin 201 which extends through the holes 420, 211 and 221 so as to rotatably secure the chain mover member 40 to the rocking link 20.

Retainer means, such as C-clip 120, is provided to retain the moving parts of the front derailleur 1, for example retaining the rocking link 20 on the pivot 12.

The pivots 12 and 13 and the pivot pins 201 and 301 generally form a parallelogram so that the rocking link 20, the pivoting link 30, the side extension 11 of the support ring 10 and the chain mover member 40 together form a parallelogram linkage, as mentioned previously, which allows the pivoting link 30 to synchronously move with the rocking link 20 for moving the chain mover member 40 to switch the drive chain 50 between the front chain wheels 51.

The rocking link 20 has a sideways lever 26 extending from the second plate 22 in such a way to form a V shape with the second plate 22, the pivot 12 being located at the vertex of the V shape so that a force applied to the end of the lever 26 causes the rocking link 20 to rotate about the pivot 12 and thus makes the chain mover member 40 which is pivoted to the rocking link 20 by the pivot pin 201 distant from the pivot 12 to move relative to the pivot 12 and thus the support ring 10 which is secured to the seat tube 2 of the bicycle frame.

The lever 26 comprises cable securing means attached to an end thereof to secure an end of a control cable 25 thereon. As is well known to those skilled in the art, the control cable 25 has an opposite end secured to a manual shifter (not shown in FIGS. 1 and 2) which is generally located at a position substantially higher than the front derailleur 1 to be operated by a bicyclist so that by pulling the cable 25 with the manual shifter, the lever 26 is forced to rotate upward about the pivot 12 and thus moves the chain mover member 40 by means of the pivot coupling (pivot pin 201) between the chain mover member 40 and the rocking link 20.

Due to the parallelogram structure of the front derailleur 1, the movement of the rocking link 20 makes the pivoting link 30 to move simultaneously to help moving the chain mover member 40 which is also pivoted to the pivoting link 30 by means of pivot pin 301.

The cable securing means comprises a groove 226 formed on the free end of the lever 26 within which an end of the cable 25 is disposed. The cable securing means further comprises a blot 223 which extends through a hole 222 formed on the lever 26, located in the proximity of the groove 226. The bolt 223 is secured on the hole 222 by a nut 225 with a washer 224 therebetween. The hole 222 is so closed to the groove 226 that when the nut 225 is tightened, the washer 224 which covers the groove 226, pinches and thus secures the cable 25 within the groove 226.

The front derailleur 1 further comprises biasing means disposed between the support ring 10 and the rocking link 20 to bias the rocking link 20 and the chain mover member 40 to an originally-set position, as shown by the solid line in FIG. 2. In the embodiment illustrated, the biasing means comprises a spring 24 which has a first end secured to the pivot 13 mounted to the side extension 11 of the support ring 10 and a second end in abutting engagement with the pivot pin 201 which couples the chain mover member 40 to the rocking link 20. Preferably, the spring 24 is a helical spring that is loosely fit over the pivot 12 with the ends thereof engaging the pivot 13 and the pivot pin 201.

The side extension 11 of the support ring 10 is further provided with a top flange 110 having formed thereon two inner-threaded holes 113 within which two screws 111 and 112 are threadingly received. The two screws 111 and 112 has a length which extends out of the top flange 110 to be abutted against by a top edge 212 of the first plate 21. The length of the screws 111 and 112 extending out of the top flange 110 is adjustable by rotating the screws 111 and 112 within the inner-threaded holes 113. By the adjustment of the length of the screws 111 and 112 extending out of the top flange 110, the angular rotation range of the rocking link 20 is adjustable. This allows the user to set the stroke of the chain mover member 40.

With particular reference to FIG. 2, due to the biasing action provided by the spring 24, the chain mover member 40, together with the drive chain 50, is retained in the originally-set position, as shown by solid line of FIG. 2. When the manual shifter is moved by the bicyclist, the control cable 25 is moved in direction A and thus rotating the rocking link 20 about the pivot 12. This causes the chain mover member 40 to move in direction B toward the position illustrated by the phantom line and thus makes the drive chain 50 switch to a different chain wheel 51. In this way, the speed ratio of the front chain wheel to the rear chain wheel of the bicycle is changed.

It is apparent that although the invention has been described in connection with the embodiment as a garbage bag, it is contemplated that those skilled in the art may make changes to the preferred embodiment without departing from the scope of the invention as defined in the appended claims.

What is claimed is:

1. A bicycle front derailleur comprising:
   a support ring fixedly secured to a seat tube of the bicycle, the support ring having a side extension formed thereon with two parallel pivots mounted thereto;

a rocking link having a first plate and a second plate spaced from each other and connected together by a connection piece, each of the first and second plate having a pair of holes formed thereon, the holes formed on the first plate being substantially aligned with the holes formed on the second plate, a first one of the holes of the first plate having a first one of the two parallel pivots of the side extension of the support ring to rotatably extend therethrough, the first pivot of the support ring also extending through a first one of the holes of the second plate so as to pivotally secure the rocking link to the side extension of the support ring;

a pivoting link having a first hole formed on a first end thereof to rotatably receive therein a second one of the two parallel pivots of the side extension of the support ring, the pivoting link further having a second hole formed on a second end thereof;

a chain mover member having a first pair of tabs each having a hole formed thereon and aligned with each other and a second pair of tabs each having a hole formed thereon and aligned with each other, a first pivot pin extending through the holes of the first tabs and a second one of the holes of the first and second plates of the rocking link to pivotally secure the chain mover member to the rocking link, a second pivot pin extending through the holes of the second tabs of the chain mover member and the second hole of the pivoting link so as to pivotally secure the chain mover member to the pivoting link;

the side extension of the support ring, the rocking link, the pivoting link and the chain mover member together forming a parallelogram linkage in which the chain mover member is moveable relative to the side extension of the support ring which is fixed on the bicycle;

the chain mover member further comprising a slot through which a drive chain loosely extends to be moved by the movement of the chain mover member relative to the support ring;

biasing means for biasing the chain mover member relative to the side extension to an originally-set position; and a lever mounted to the second plate of the rocking link in such a way to form a V shape having a vertex with the first hole of the second plate located thereon, the lever having a free end distant from the second plate with cable securing means formed thereon to secure an end of a control cable, the control cable having an opposite end extending upward to connect to a manual shifter located at a position higher than said front derailleur so that by pulling the control cable upward with the manual shifter, the rocking link is rotated about the first pivot by the lever to have the chain mover member moved from the originally-set position by the pivot coupling thereof with the rocking link and thus move the drive chain.

2. The bicycle front derailleur as claimed in claim 1, wherein said biasing means comprises a helical spring which is loosely fit over the first pivot mounted on the side extension with a first end thereof attached to the second pivot mounted to the side extension and a second end attached to the first pivot pin connecting between the rocking link and the chain mover member.

3. The bicycle front derailleur as claimed in claim 1, wherein said cable securing means comprises a groove formed on the free end of the lever within which the end of the control cable is disposed, a hole formed on the free end of the lever in the proximity of the groove to allow a bolt to extend therethrough and a nut member which engages the bolt to secure the bolt on the free end of the lever with a washer member therebetween, said washer member being large enough to at least partially cover the groove so as to pinch and thus secure the end of the control cable on the free end of the lever when the bolt-nut pair is tightened.

4. The bicycle front derailleur as claimed in claim 1 further comprising means for adjusting stroke distance of the chain mover member by which the chain mover member moves the drive chain.

5. The bicycle front derailleur as claimed in claim 4, where in the stroke adjusting means comprises screws threadingly engaging with inner-threaded holes formed on a top flange of the side extension and having a length downward extending out of the inner-threaded hole to be abutted against by a top edge of the first plate of the rocking link so as to set and adjust a rotation limit for the rocking link about the first pivot mounted to the side extension and thus by adjusting the length of the screws extending out of the inner-threaded holes, the stroke of the chain mover member is adjusted.

* * * * *